(12) United States Patent
Park

(10) Patent No.: US 7,636,183 B2
(45) Date of Patent: Dec. 22, 2009

(54) IMAGE READING APPARATUS INCLUDING IMAGE SENSORS AND IMAGE FORMING APPARATUS INCLUDING THE SAME

(75) Inventor: Sang-cheol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 11/442,537

(22) Filed: May 30, 2006

(65) Prior Publication Data

US 2007/0002401 A1 Jan. 4, 2007

(30) Foreign Application Priority Data

Jun. 30, 2005 (KR) .................... 10-2005-0058097

(51) Int. Cl.
*H04N 1/04* (2006.01)

(52) U.S. Cl. ................ 358/498; 358/496; 358/474; 358/408; 358/483; 399/367; 399/374; 399/371; 399/364

(58) Field of Classification Search ........... 358/496, 358/498, 408, 474, 483; 399/367, 374, 371; 399/364; 355/23, 24; 382/318, 319
See application file for complete search history.

(56) References Cited

U.S. PATENT DOCUMENTS 6,640,082 B2 * 10/2003 Mitomi ................. 399/374

7,202,983 B2 * 4/2007 Yokota et al. ............. 358/496
7,355,763 B2 * 4/2008 Furihata ................... 358/474

FOREIGN PATENT DOCUMENTS

| JP | 11-58914 | 3/1999 |
|----|----------|--------|
| JP | 2002-96956 | 4/2002 |
| JP | 2003-241442 | 8/2003 |
| JP | 2004-187144 | 7/2004 |

* cited by examiner

*Primary Examiner*—Cheukfan Lee
(74) *Attorney, Agent, or Firm*—Stein McEwen, LLP

(57) ABSTRACT

An image reading apparatus includes a first reading part which reads a first side of a document, a second reading part located on a document discharge path which reads a second side of the document with an image sensor, a path narrowing member positioned across from the image sensor on the document discharge path; and an adjusting unit, wherein the adjusting unit adjustably moves the path narrowing member closer to and farther away from the image sensor in order to correspondingly move the document closer to and farther away from the image sensor. The image reading apparatus is capable of increasing reading speed when a one-side reading of a document is performed as well as minimizing any damage done to data produced by the reading when a double-side reading of a document is performed. Thus, the present invention is capable of increasing a reading speed when an one-side reading is performed as well as minimizing any damages done to data produced by the reading when a double-side reading is performed, and an image forming apparatus including the same.

14 Claims, 6 Drawing Sheets

IMAGE READING APPARATUS INCLUDING IMAGE SENSORS AND IMAGE FORMING APPARATUS INCLUDING THE SAME

CROSS-REFERENCE TO RELATED APPLICATIONS

This application claims the benefit of Korean Patent Application No. 2005-58097, filed Jun. 30, 2005, in the Korean Intellectual Property Office, the disclosure of which is incorporated herein by reference.

BACKGROUND OF THE INVENTION

1. Field of the Invention

Aspects of the present invention relate to an image reading apparatus and image forming apparatus including the same, and more particularly, to an image reading apparatus including a plurality of image sensors for a double-side reading (i.e., reading images of both sides of a document sheet at a time), and an image forming apparatus including the same.

2. Description of the Related Art

In general, an image reading apparatus has a function of reading an image of a document to convert it into computer readable image data. Such image reading apparatuses can be divided into two types: a flatbed type, which includes an image reading platform for accommodating a document and an image sensor that moves reciprocatingly along the image reading platform to read an image of the document; and an automatic document feeding type, which reads an image of the document by making the document move past a stationary image sensor.

As described in Japanese Patent Laid-Open Publication No. 2004-187144 (publication date: Jul. 2, 2004) entitled "IMAGE READING APPARATUS," an image reading apparatus in combination with the flatbed and automatic document feeding types has been recently developed. FIG. 1 shows the combination-type image reading apparatus disclosed in the aforementioned patent laid-open publication.

As shown in FIG. 1, an image reading apparatus 100 includes an image reading platform 110 having an image sensor part 111 and a light exposing part 112 therein, and an automatic document feeder 120 provided at an upper side portion of the image reading platform 110.

The light exposing part 112 is configured to be reciprocated right and left in the image reading platform 110 to irradiate light on a document 1 placed on the image reading platform 110. A reflected light from the document 1 is transmitted to the image sensor part 111 which produces data using the reflected light.

Further, the automatic document feeder 120 includes a paper-feeding part 121, a first reading part 122, a second reading part 123 and a paper discharge part 125. After being supplied to the paper-feeding part 121, a document is initially moved past the first reading part 122 while one side of the document is read through the light exposing part 112 and the image sensor part 111 positioned below the document, then is moved past the second reading part 123 while the other side of the document is read by an image sensor part 124, and finally is discharged through the paper discharge part 125.

The image sensor part 124 installed at the second reading part 123 is usually provided with a contact image sensor. In such a case, the document is moved past the second reading part 123 while its surface makes contact with the contact image sensor.

However, in a case where the reading of the document is performed using an automatic document feeder 120, the document is always moved with its surface making contact with the image sensor part 124 of the second reading part 123, even when double-side printing is not performed. This unnecessary contact between the image sensor part 124 and the document creates a problem in that the quality of data produced by reading the document is degraded as the image sensor part 124 is damaged or foreign matters are attached to the image sensor part 124.

Further, as shown in FIG. 1, in a case where the contact image sensor is used as the image sensor part 124, the image sensor part 124 is installed so that the distance between the image sensor part 123 and the side of the document being read by the image sensor part 124 decreases in order to read the image of the document correctly, which causes a problem because the transferring speed of the document is substantially lowered.

Accordingly, this leads to a reduction of the document reading speed when a one-side reading is performed using the automatic document feeder 120, since the document is moved past the second reading part 123 at a lowered transferring speed.

SUMMARY OF THE INVENTION

Accordingly, it is one aspect of the present invention to provide an image reading apparatus including a plurality of image sensors for a double-side reading, which is capable of increasing a reading speed when a one-side reading is performed as well as minimizing any damage done to data produced by the reading when a double-side reading is performed, and an image forming apparatus including the same.

The foregoing and/or other aspects of the present invention can be achieved by providing an image reading apparatus, which includes a paper-feeding part to supply a document, a first reading part to read a first side of the document, a second reading part, provided at a paper discharge path of the document having passed through the first reading part, to read a second side of the document, wherein the second reading part comprises: an image sensor provided at one side of the paper discharge path; a path narrowing member provided at the other side of the paper discharge path so as to face the image sensor, the path narrowing member being moved between a narrowing position where the path narrowing member is located closer to the image sensor to narrow the paper discharge path and an opening position where the path narrowing member opens the paper discharge path entirely; and a driving unit to move the path narrowing member.

According to an aspect of the present invention, the path narrowing member is disposed so as to slide toward and away from the image sensor.

According to an aspect of the present invention, the driving unit comprises a cam member to drive the path narrowing member towards and away from the image sensor.

According to an aspect of the present invention, the driving unit further comprises an elastic member interposed between the path narrowing member and the cam member.

According to an aspect of the present invention, the apparatus further comprises a controller to control a rotation of the cam member according to a one-side printing or a double-side printing mode selection by a user.

According to an aspect of the present invention, the path narrowing member has a rotating member rotating between the narrowing position and the opening position.

According to an aspect of the present invention, the rotating member comprises a cam member.

According to an aspect of the present invention, the apparatus further comprises a controller to control a rotation of the cam member according to a one-side printing or a double-side printing mode selection by a user.

The foregoing and/or other aspects of the present invention can be achieved by providing an image reading apparatus, comprising a paper-feeding part to supply a document; a first reading part to read a first side of the document; a body part having a paper discharge path and a supplementary paper discharge path formed therein, which discharge the document having passed through the first reading part; a second reading part, provided at the paper discharge path, to read a second side of the document; and a transferring guide part which rotates to guide the document having passed through the first reading part into either of the paper discharge path and the supplementary paper discharge path.

According to an aspect of the present invention, the apparatus further comprises a controller to control a rotation of the cam member according to a one-side printing or a double-side printing mode selection by a user.

According to an aspect of the present invention, an image forming apparatus comprises the image reading apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompany drawings, in which.

DETAILED DESCRIPTION OF THE EMBODIMENTS

Figure 1:
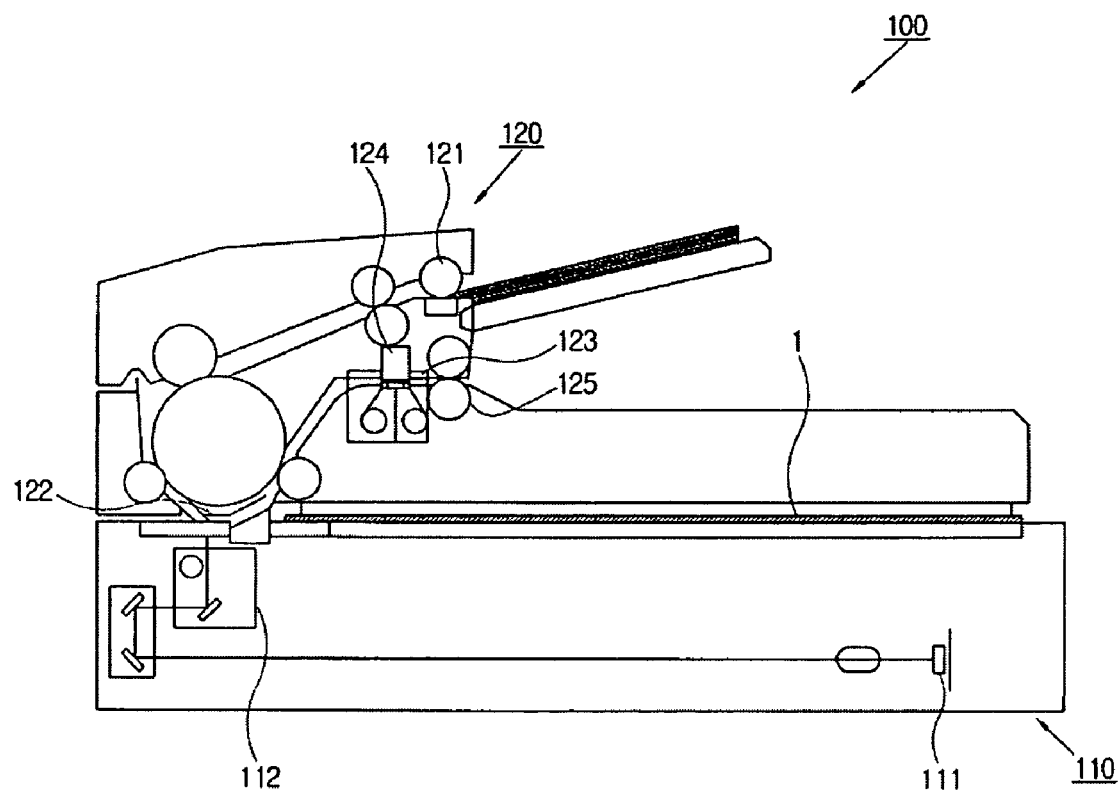
FIG. 1 illustrates a cross sectional view of a conventional image reading apparatus.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 2:
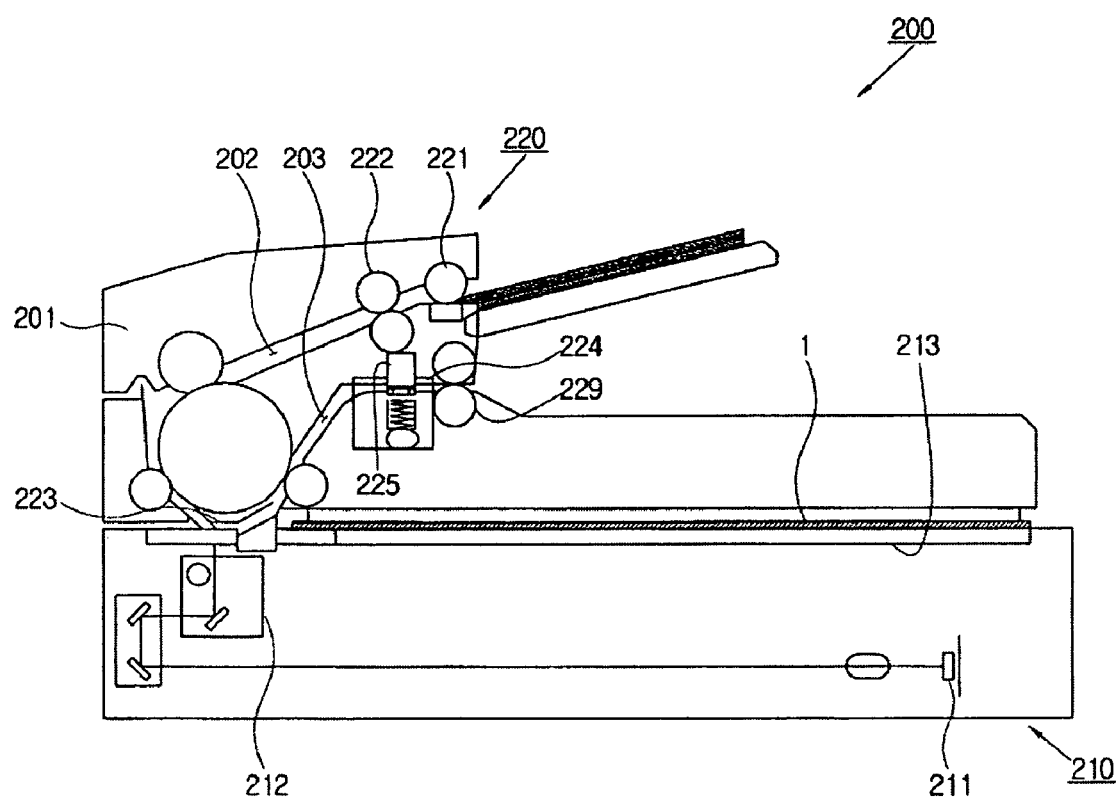
FIG. 2 shows a cross sectional view of an image reading apparatus in accordance with a first embodiment of the present invention.

As shown in FIG. 2, an image reading apparatus 200 in accordance with a first embodiment of the present invention includes an image reading platform 210 having an image sensor part 211 and a light exposing part 212 therein, and an automatic document feeder 220 provided at an upper side of the image reading platform 210.

The light exposing part 212 is configured to be reciprocated right and left in the image reading platform 210 to irradiate light on a document 1 placed on a platen glass 213. A reflected light from the document 1 is transmitted to the image sensor part 211 which produces data using the reflected light.

The automatic document feeder 220 includes a paper feeding part 221, a first reading part 223, a second reading part 224 and a paper discharging part 229.

Further, the automatic document feeder 220 includes a body part 201 having a paper feeding path 202 which connects the paper feeding part 221 to the first reading part 223, and also having a paper discharge path 203 which connects the first reading part 223 to the paper discharge part 229. The paper discharge path 203 is also referred to as a document discharge path.

After being supplied to the paper feeding part 221, the document is moved past the first reading part 223 through transferring rollers 222, which are disposed on the paper feeding path 202, while its one side is read through the light exposing part 212 and the image sensor part 211 positioned below the document. Although these documents may be paper, it is contemplated that other types of print media may be used in accordance with the present invention, such as overheads, transparencies, etc.

The light exposing part 212 and the image sensor part 211, which are both located in the image reading platform 210, are used to read the document 1 placed on the platen glass 213. Alternatively, the light exposing part 212 and the image sensor part 211 may also be used to read a document passing through the automatic document feeder 220 when the light exposing part 212 is positioned at the first reading part 223.

Therefore, in the present invention, it is contemplated that the light exposing part 212 and the CCD sensor part 211 are included not only in the image reading platform 210 but also in the first reading part 223.

After being moved past the first reading part 223, the document is moved past the second reading part 224 through the paper discharge path 203 while its other side is read by the contact image sensor 225, and then is discharged through the paper discharge part 229.

The contact image sensor 225 of the second reading part 224 is provided at an upper surface of the paper discharge path 203.

Figure 3:
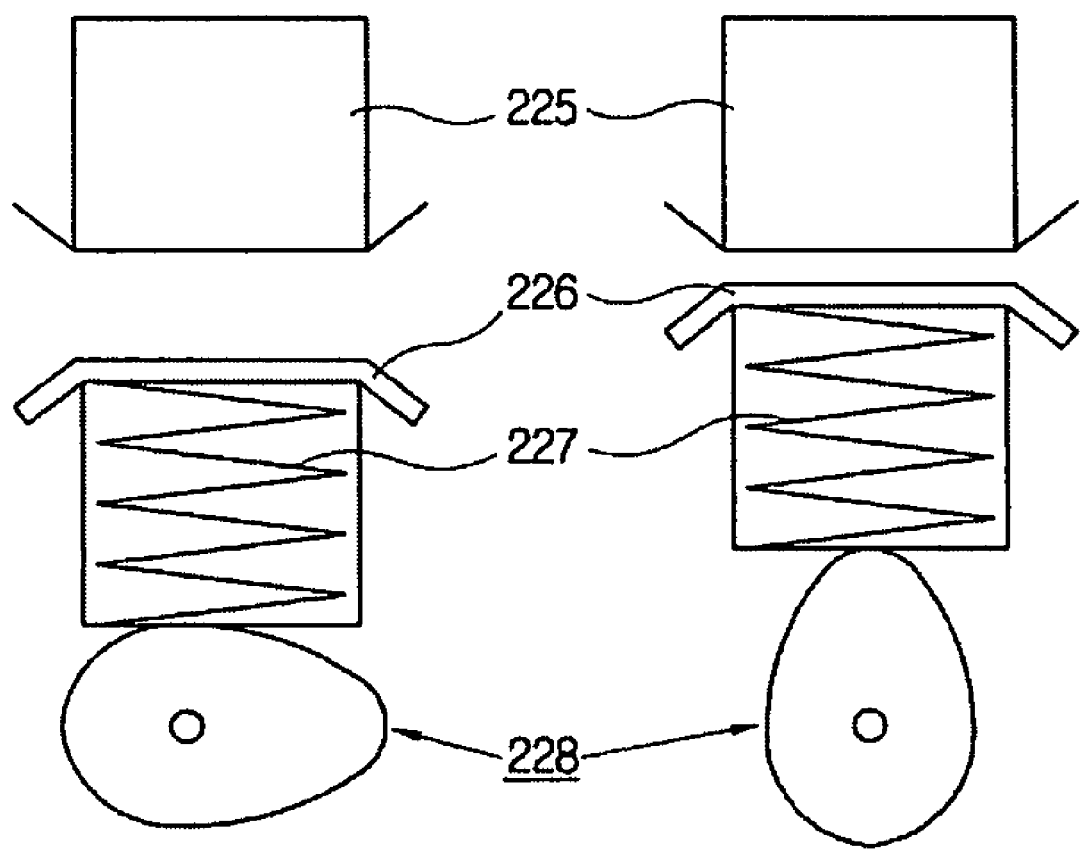
FIG. 3 offers a conceptual view of one portion of FIG. 2 to explain its operation.

Furthermore, as shown in FIGS. 2 and 3, the second reading part 224 has a path narrowing member 226 which is provided at a lower surface of the paper discharge path 203 so as to face the contact image sensor 225, an elastic member 227 provided at a lower side of the path narrowing member 226, and a cam member 228 provided at a lower side of the elastic member 227.

Herein, the path narrowing member 226 and the elastic member 227 are accommodated in and supported by the body part 201 so as to enable a sliding motion in an upper and lower direction.

Figure 4:
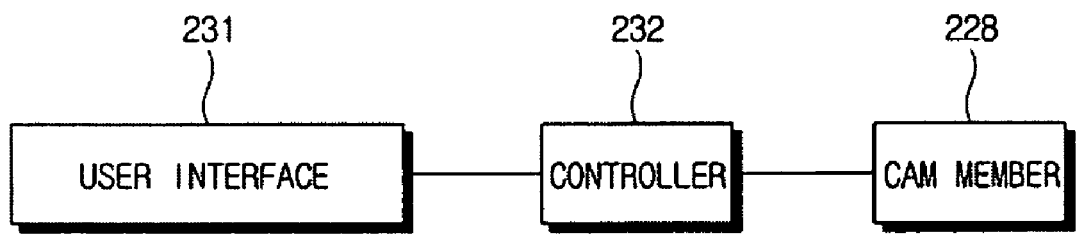
FIG. 4 is a block diagram describing a control relation of FIG. 2.

The cam member 228 includes a driving motor, and reciprocates the elastic member 227 upward and downward by a controller 232 (see FIG. 4) separately provided at the image reading apparatus 200, thereby in turn reciprocating the path narrowing member 226 vertically toward and away from the contact image sensor 225.

By the vertical reciprocating motion of the path narrowing member 226, the paper discharge path 203 is narrowed or opened under the contact image sensor 225. FIG. 3 offers drawings for explaining this motion of the path narrowing member 226. In FIG. 3, the left drawing illustrates a state in which the path narrowing member 226 is located at an open position, and the right drawing illustrates a state in which the path narrowing member 226 is located at a narrow position.

When the document is read using the automatic document feeder 220, the path narrowing member 226 as described above is located in the open position or the narrow position by the operation of the cam member 228 according to whether a one-side or double-side reading on the document is performed.

In a case of one-side reading, the document is read only by the light exposing part 212 and the image sensor part 211 of the first reading part 223, and is not read by the contact image sensor 225 of the second reading part 224. At this time, the cam member 228 is rotated as in the left drawing of FIG. 3, so that the path narrowing member 226 is located at the opening position, thus allowing the document, which has already passed through the first reading part 223 and paper discharge path 203, to be transferred out to the paper discharging part 229 without its surface making contact with the contact image sensor 225. Therefore, it is possible to prevent the contact image sensor 225 from being damaged and to prevent foreign matters from being transferred from the document to the contact image sensor 225. Additionally, there is a benefit in that the transferring speed of the document is increased when compared to the situation where the paper discharge path 203 is narrowed.

In a case of double-side reading, the document is read by the second reading part 224 as well as the first reading part 223. Therefore, as shown in the right drawing of FIG. 3, the cam member 228 is driven to rotate so that the path narrowing member 226 is moved upward so as to be located at the narrow position, thus allowing the document, which has already passed through the first reading part 223 and paper discharge path 203, to be transferred with its surface making contact with the contact image sensor 225. The contact image sensor 225 is activated to read the document transferred with its surface contacted therewith. At this time, the elastic member 227 has a function to press the document transferred thereto through the paper discharge path 203 into the contact image sensor 225 by elastically pressing the path narrowing member 226 upward in order to improve the quality of document readability.

The combination of the path narrowing member 226, the cam member 228, and the elastic member 227 may be referred to as an adjusting unit. The adjusting unit may be configured to include any combination of these elements and other elements, in accordance with this and/or other aspects of the present invention.

The cam member 228 may be rotated, for example, in forward and backward directions, by the control of the controller 232 according to input of the double-side reading or the one-side reading mode by a user through a user interface part 231 provided at the image reading apparatus 200. Alternatively, the cam member 228 may be operated manually by a user through a manual operation part (not shown) provided at, for example, the body part 201. There are many different ways to control the cam member 228 in order to move the path narrowing member 226 back and forth between an open and a narrow position.

Further, unlike the first embodiment, a cam may be used as a rotating member for narrowing a path, and the narrowing and opening of the paper discharge path 203 may be performed by the forward and backward rotation of the cam. In such a case, the controller 232 rotates the cam forward and backward according to whether the user selects the selection of the double-side reading mode or the one-side reading mode, so that the paper discharge path 203 can be narrowed or opened. Undoubtedly, in this case, the cam can also be provided so as to be manually operated. It is contemplated that there are numerous ways to operate the cam if it is used as a rotating member for narrowing a path, and the invention should not be limited to those described herein.

The rotating member for narrowing a path can also be constituted by any other type of rotable member, such as a lever and the like, as well as the cam, which is operated for the narrowing and opening of the paper discharge path 203. This rotating member is also referred to as an adjusting member.

In a case where the rotatable member, such as a cam, a lever or the like, is used as the rotating member for narrowing a path, a spring or the like may be installed at its rotating axle so that its rotating axle can be elastically rotated. Therefore, it is possible to contact the document transferred through the paper discharge path 203 with the contact image sensor 225 by elastically pressing it toward the contact image sensor 225.

Figure 5:
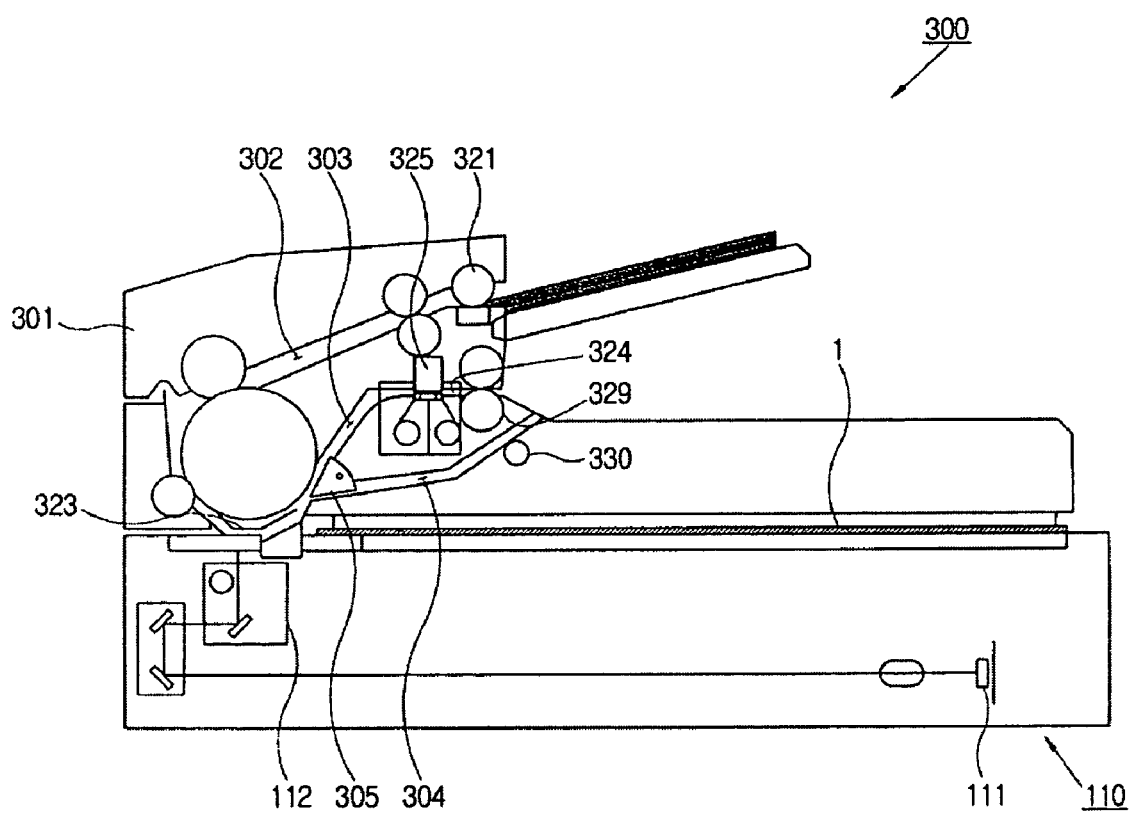
FIG. 5 describes a cross sectional view of an image reading apparatus in accordance with a second embodiment of the present invention.

Referring to FIG. 5, there is shown a cross sectional view of an image reading apparatus in accordance with a second embodiment of the present invention. A paper reading apparatus 300 includes a paper-feeding part 321, a first reading part 323, a second reading part 324 and paper discharge part 329, and their construction and operation are identical to those of the first embodiment. This paper reading apparatus is not limited to reading paper. It may also read other types of print media, such as overheads, transparencies, etc.

Unlike the first embodiment, in this second embodiment, a supplementary paper discharge path 304, which functions as a transferring path of a document discharged from the first reading part 323, is formed in a body part 301 in which a paper feeding path 302 and a paper discharge path 303 are formed.

The paper discharge path 303 and the supplementary paper discharge path 304 are connected with the first reading part 323, and a document passing through the first reading part 323 can be discharged by selecting one of the two paths, either the paper discharge path 303 or the supplementary paper discharge path 304. The selection of the paper discharge path 303 or the supplementary paper discharge path 304 is made by rotating a transferring guide part 305 provided at a common inlet of the two paths 303 and 304.

In a case of double-side reading, the transferring guide part 305 is rotated so that the paper discharge path 303 is opened while, at the same time, the supplementary paper discharge path 304 is closed. Therefore, the document passing through the first reading part 323 is transferred through the paper discharge path 303, read in the second reading part 324, and then discharged to the outside through the paper discharge part 329.

On the other hand, in a case of one-side reading, the transferring guide part 305 is rotated so that the supplementary paper discharge path 304 is opened while, at the same time, the paper discharge path 303 is closed. Therefore, the document passing through the first reading part 323 is discharged through the supplementary paper discharge path 304. In a discharging end portion of the supplementary paper discharge path 304, a supplementary paper discharge part 330 is provided. Accordingly, in a case of one-side printing, as the document passes through the supplementary paper discharge path 304, the transferring speed of the document is increased, so that the overall reading speed of the document is advantageously increased. Additionally, since the document does not pass through the paper discharge path 303, damage to a contact image sensor 325 of the second reading part 324 by its contact with the document does not occur.

Like the first embodiment, in this second embodiment, the transferring guide part 305 may be rotated forward and backward automatically by the control of a controller (not shown) which receives a mode selection input of one-side or double-side reading by a user. Alternatively, the transferring guide part 305 can be operated manually by a user's direct operation. There are numerous different ways to rotate the transferring guide part 305, and the invention should not be limited to those described herein.

As described above, in the second embodiment, since the discharging path of the document is altered according to whether the user wants one-side or double-side reading, some constructions, such as the path narrowing member 226 (see FIG. 3), the cam member 228, and the like, are unnecessary. Therefore, the second reading part 324 provided on the paper discharge path 303 is formed using the partially narrowed paper discharge path 303 as in the prior art.

Figure 6:
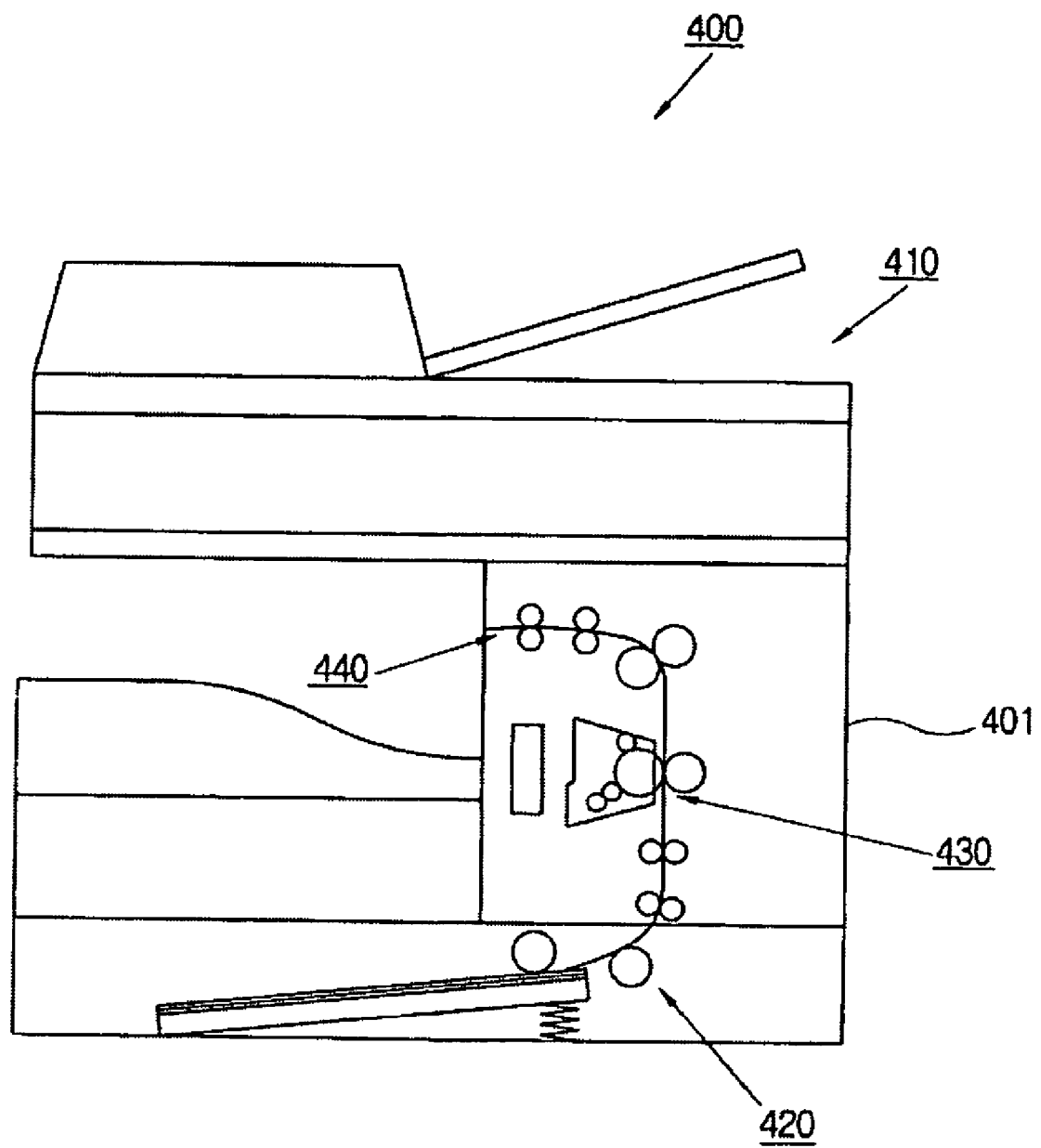
FIG. 6 presents a cross sectional view of an image forming apparatus in accordance with an embodiment of the present invention.

As shown in FIG. 6, an image forming apparatus 400 in accordance with an embodiment includes an image reading apparatus 410 described above in the first embodiment or the second embodiment.

The image forming apparatus 400 also includes a paper supply part 420 for supplying paper, an image forming part 430 for forming an image on the paper supplied from the paper supply part 420, a paper discharge part 440 for discharging the paper on which the image is formed, and a main body housing 401 for enclosing and supporting the aforementioned parts. The image reading apparatus 410 is mounted in the main body housing 401.

In a case where the image reading apparatus 410 is included in the image forming apparatus 400 to form one body, reading the document and transmitting document data obtained from the reading in the image reading apparatus 410 are both performed according to the control of a controller (not shown) provided in the image forming apparatus 400. The document data read by the image reading apparatus 410 is transmitted to the image forming part 430 to be printed on the paper, photocopied to the document, stored in a storing part (not shown) of the image forming apparatus 400, or transmitted to an external device, such as a computer or the like, connected to the image forming apparatus 400.

In accordance with aspects of the image reading apparatus and the image forming apparatus including the same of the present invention, when one-side reading is performed, the document reading speed can be increased for reduction in frictional resistance on the document being transferred. Moreover, when double-side reading is performed, quality degradation of the double-side reading can be prevented since it is possible to minimize damage done to the image sensors used.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An image reading apparatus, comprising:
   a first reading part that reads a first side of a document;
   a second reading part located on a document discharge path, which reads a second side of the document with an image sensor;
   a path narrowing member positioned across from the image sensor on the document discharge path; and
   an adjusting unit that adjustably moves the path narrowing member closer to and farther away from the image sensor, in order to correspondingly move the document closer to and farther away from the image sensor.

2. The apparatus according to claim 1, wherein the document makes contact with the image sensor when the path narrowing member is moved closer to the image sensor by the adjusting unit.

3. The apparatus according to claim 2, wherein the adjusting unit comprises a cam member.

4. The apparatus according to claim 3, wherein the adjusting unit comprises an elastic member positioned between the path narrowing member and the cam member, to elastically bias the path narrowing member towards the image sensor.

5. The apparatus according to claim 4, further comprising a controller located on an outside area of the image reading apparatus, which allows a user to rotate the cam member to adjust the adjusting unit.

6. An image forming apparatus, comprising:
   a paper supply part that supplies paper into the image forming apparatus;
   an image forming part that forms an image on the paper;
   a paper discharge part that discharges the paper, after the image has been formed on the paper;
   a housing that encloses the paper supply part, the image forming part, and the paper discharge part; and
   the image reading apparatus according to claim 1, mounted in the housing.

7. An image reading apparatus, comprising:
   a first reading part on a document feeding path, which reads a first side of a document;
   a second reading part located on a document discharge path, which reads a second side of the document with an image sensor;
   a path narrowing member positioned across from the image sensor on the document discharge path, which directly contacts the document; and
   an adjusting member that rotates to selectively move the path narrowing member, such that the path narrowing member moves the document closer to and farther away from the image sensor.

8. The image reading apparatus according to claim 7, further comprising an elastic member positioned between the path narrowing member and the adjusting member, to elastically bias the path narrowing member towards the image sensor.

9. The apparatus according to claim 8, wherein the adjusting member comprises a cam member.

10. An image forming apparatus, comprising:
    a paper supply part that supplies paper to the image forming apparatus;
    an image forming part that forms an image on the paper;
    a document discharge part that discharges the paper, after the image has been formed on the paper;
    a housing that encloses the paper supply part, the image forming part, and the paper discharge part; and
    the image reading apparatus according to claim 7, mounted in the housing.

11. An image reading apparatus, comprising:
    a first reading part on a document feeding path, which reads a first side of a document;
    a second reading part located on a document discharge path, which reads a second side of the document with an image sensor;
    an adjusting member positioned across from the image sensor, on the document discharge path; and
    a controller located on an outside area of the image reading apparatus, which allows a user to adjust the adjusting member, wherein,
    the adjusting member directly contacts the document, to move the document closer to and father away from the image sensor, and
    the document makes contact with the image sensor, when the adjusting member is rotated to move the document closer to the image sensor.

12. An image reading apparatus, comprising:
- a document-feeding part that supplies a document into the image reading apparatus;
- a first reading part that reads a first side of the document;
- a body part where the document is guided to after passing through the first reading part, having a document discharge path and a supplementary document discharge path formed therein;
- a second reading part located on the document discharge path, which reads a second side of the document; and
- a transferring guide part that is adjustable, to guide the document into either the document discharge path or the supplementary document discharge path, for double-side or one-side reading of the document, respectively.

13. The apparatus according to claim 12, further comprising a controller housed outside of the image reading apparatus, which allows a user to rotate the transferring guide part to guide the document into either the document discharge path or the supplementary document discharge path, for double-side or one-side reading of the document, respectively.

14. An image forming apparatus, comprising:
- a paper supply part that supplies paper into the image forming apparatus;
- an image forming part that forms an image on the paper;
- a paper discharge part that discharges the paper after the image has been formed on the paper;
- a housing that encloses the paper supply part, the image forming part, and the paper discharge part; and
- the image reading apparatus according to claim 12, mounted in the housing.

* * * * *

UNITED STATES PATENT AND TRADEMARK OFFICE
CERTIFICATE OF CORRECTION

PATENT NO. : 7,636,183 B2
APPLICATION NO. : 11/442537
DATED : December 22, 2009
INVENTOR(S) : Sang-cheol Park It is certified that error appears in the above-identified patent and that said Letters Patent is hereby corrected as shown below:

Column 10, Line 9, change "paper after" to --paper, after--.

Signed and Sealed this

Sixth Day of July, 2010

David J. Kappos
*Director of the United States Patent and Trademark Office*